(12) United States Patent
Barsness et al.

(10) Patent No.: US 7,720,874 B2
(45) Date of Patent: May 18, 2010

(54) DYNAMICALLY ALLOCATING SPACE FOR A FIXED LENGTH PART OF A VARIABLE LENGTH FIELD IN A DATABASE TABLE

(75) Inventors: Eric Lawrence Barsness, Pine Island, MN (US); John Matthew Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 296 days.

(21) Appl. No.: 11/769,204

(22) Filed: Jun. 27, 2007

(65) Prior Publication Data

US 2009/0006425 A1 Jan. 1, 2009

(51) Int. Cl.
 *G06F 17/30* (2006.01)
 *G06F 7/00* (2006.01)
 *G06F 15/16* (2006.01)
(52) U.S. Cl. .................... 707/802; 707/803
(58) Field of Classification Search ............. 707/2–6, 707/100, 200–205, 101–102
 See application file for complete search history.

(56) References Cited

U.S. PATENT DOCUMENTS

| | | | | |
|---|---|---|---|---|
| 6,065,013 A * | 5/2000 | Fuh et al. | ............... | 707/103 R |
| 7,171,423 B2 * | 1/2007 | Nishikawa et al. | ............ | 707/102 |
| 7,406,575 B2 * | 7/2008 | Lam et al. | ................. | 711/161 |
| 2005/0154757 A1 | 7/2005 | Barsness et al. | | |

\* cited by examiner

*Primary Examiner*—Cam Y Truong
*Assistant Examiner*—Cecile Vo
(74) *Attorney, Agent, or Firm*—Matthew J. Bussan

(57) ABSTRACT

An enhanced space allocation mechanism (ESAM) for dynamically allocating space for a fixed length part of variable length fields, such as VARCHAR fields, in database tables. Each record in such a variable length field has a fixed length part, a variable length part, and a pointer to the variable length part. The ESAM determines how much space to allocate based on the data that was historically put into these tables. In one embodiment, a database management system (DBMS) maintains a historical record that includes fields identifying the table, column and application ID, as well as fields that track a count and a total length. For each variable length field in a Structured Query Language (SQL) statement such as CREATE table or ALTER table, the DBMS finds a matching historical record, determines an estimated optimal fixed portion length based on the matching historical record, and sets a space allocation length for the fixed length part of the variable length field based on the estimated optimal fixed portion length. This dynamic space allocation approach is especially advantageous in situations where an empty table will be loaded with a massive amount of data.

6 Claims, 4 Drawing Sheets

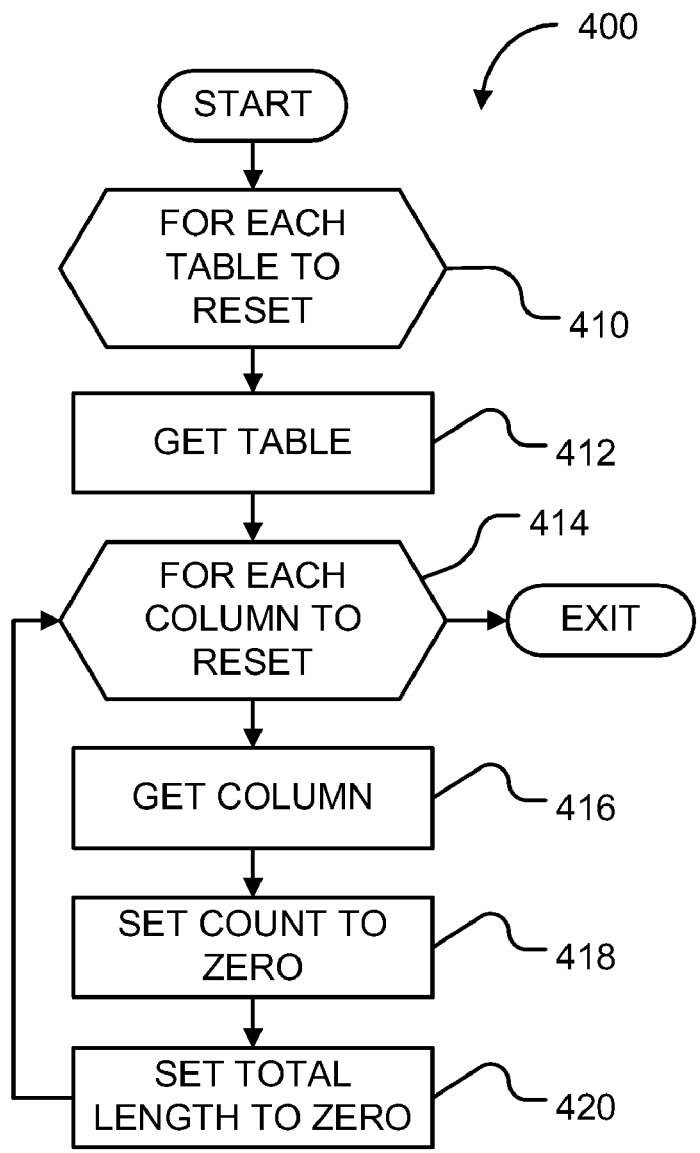

DYNAMICALLY ALLOCATING SPACE FOR A FIXED LENGTH PART OF A VARIABLE LENGTH FIELD IN A DATABASE TABLE

BACKGROUND OF THE INVENTION

1. Field of Invention

The present invention relates in general to the digital data processing field and, in particular, to database management systems. More particularly, the present invention relates to a mechanism for dynamically allocating space for a fixed length part of a variable length field (e.g., a VARCHAR field) in a database table.

2. Background Art

In the latter half of the twentieth century, there began a phenomenon known as the information revolution. While the information revolution is a historical development broader in scope than any one event or machine, no single device has come to represent the information revolution more than the digital electronic computer. The development of computer systems has surely been a revolution. Each year, computer systems grow faster, store more data, and provide more applications to their users.

A modern computer system typically comprises at least one central processing unit (CPU) and supporting hardware, such as communications buses and memory, necessary to store, retrieve and transfer information. It also includes hardware necessary to communicate with the outside world, such as input/output controllers or storage controllers, and devices attached thereto such as keyboards, monitors, tape drives, disk drives, communication lines coupled to a network, etc. The CPU or CPUs are the heart of the system. They execute the instructions which comprise a computer program and direct the operation of the other system components.

The overall speed of a computer system is typically improved by increasing parallelism, and specifically, by employing multiple CPUs (also referred to as processors). The modest cost of individual processors packaged on integrated circuit chips has made multiprocessor systems practical, although such multiple processors add more layers of complexity to a system.

From the standpoint of the computer's hardware, most systems operate in fundamentally the same manner. Processors are capable of performing very simple operations, such as arithmetic, logical comparisons, and movement of data from one location to another. But each operation is performed very quickly. Sophisticated software at multiple levels directs a computer to perform massive numbers of these simple operations, enabling the computer to perform complex tasks. What is perceived by the user as a new or improved capability of a computer system is made possible by performing essentially the same set of very simple operations, using software having enhanced function, along with faster hardware.

The overall value or worth of a computer system depends largely upon how well the computer system stores, manipulates, and analyzes data. One mechanism for managing data is called a database management system (DBMS), which is a computer program that is used to access the information stored in a database. Databases are used to store information for an innumerable number of applications, including various commercial, industrial, technical, scientific and educational applications.

At a most basic level, a database stores data as a series of logical tables. Each table is made up of rows and columns. Each table has a unique name within the database and each column has a unique name within the particular table.

As the reliance on information increases, both the volume of information stored in most databases, as well as the number of users wishing to access that information, likewise increases. Moreover, as the volume of information stored in a database and the number of users wishing to access the database increases, the amount of computing resources required to manage such a database increases as well.

Database management systems therefore often require tremendous resources to handle the heavy workloads placed on such systems. As such, significant resources have been devoted to increasing the performance of database management systems with respect to processing searches, or queries, of databases for information. Different statements called queries allow the user or an application program to obtain data from the database. As one might imagine, queries range from being very simple to very complex.

Improvements to both computer hardware and software have improved the capacities of conventional database management systems. For example, in the hardware realm, increases in microprocessor performance, coupled with improved memory management systems, have improved the number of queries that a particular microprocessor can perform in a given amount of time. Furthermore, the use of multiple processors and/or multiple networked computers has further increased the capacities of many database management systems.

From a software standpoint, the use of relational databases, which organize information into formally-defined tables consisting of rows and columns, and which are typically accessed using a standardized language such as SQL (Structured Query Language), has substantially improved processing efficiency, as well as substantially simplified the creation, organization, and extension of information within a database. Furthermore, significant development efforts have been directed toward query "optimization", whereby the execution of particular searches, or queries, is optimized in a manner to minimize the amount of resources required to execute each query.

Through the incorporation of various hardware and software improvements, many high performance database management systems are able to handle hundreds or even thousands of queries each second, even on databases containing millions or billions of records. However, further increases in information volume and workload are inevitable, so continued advancements in database management systems are still required.

A table is a logical structure maintained by the database management system. Tables are made up of columns and rows. There is no inherent order of the rows within a table. At the intersection of every column and row is a specific data item called a value. A column, or a field, is a set of values of the same data type. A row is a sequence of values such that the $n^{th}$ value is a value of the $n^{th}$ column of the table. An index is a set of pointers to a table that has an entry for each record of the table. This entry is dependent on the value of that record in one or more columns of the table.

Variable character data types (often referred to as a "VARCHAR" fields) allow, in many instances, up to 32K characters of a character string to be stored. One common activity which database users frequently perform on such character strings is to search the text in the string for a particular matching substring using the LIKE predicate. An example SQL statement might resemble:

SELECT LastName FROM Customers
WHERE Lastname LIKE 'Mar %'

This query would return all the last names of all the records in the table that start with the letters "Mar".

When a database receives a query, the database interprets the query and determines what internal steps are necessary to satisfy the query. These internal steps may include identification of the table or tables specified in the query, the row or rows selected in the query, and other information such as whether to use an existing index, whether to build a temporary index, whether to use a temporary file to execute a sort, and/or the order in which the tables are to be joined together to satisfy the query. When taken together, these internal steps are typically referred to as an access plan (AP), although they are sometimes referred to as an execution plan. The access plan is typically created by a software component that is often called a query optimizer.

Allocating the appropriate amount of space for VARCHAR fields in a database table is a tricky task. Typically, a static/variable space allocation approach is used for VARCHAR fields. In such a static/variable space allocation approach, the system allocates for each record in a VARCHAR field a fixed, or static, amount of space (i.e., a "fixed length part"), plus a pointer for the rest (i.e., a "variable length part"). Thus, each record in a VARCHAR field has two parts—the first being the fixed length part and the second being the remaining variable length part. In addition, each record in a VARCHAR field has a pointer that allows the DBMS to put the two parts together. So, in a table with a single VARCHAR column with five records, each record has the fixed length part, a pointer to a variable length part, and a variable length part (which could be a different length for each of the records). The amount of space allocated for the fixed length part is fixed by a system setting. The static nature of the fixed length part often makes the static/variable space allocation approach inefficient. The static amount of space allocated by the system for the fixed length part is typically made relatively small to avoid wasting database storage space. However, by making the static amount of space allocated by the system for the fixed length part relatively small, for a given VARCHAR field the system is more likely to be burdened with the process of following pointers, which slows the speed at which the data may be accessed.

Therefore, a need exists for an enhanced mechanism for dynamically allocating space for a fixed length part of a variable length field in a database table.

SUMMARY OF THE INVENTION

According to the preferred embodiments of the present invention, an enhanced space allocation mechanism (ESAM) dynamically allocates space for a fixed length part of variable length fields, such as VARCHAR fields, in database tables. Each record in such a variable length field has a fixed length part, a variable length part, and a pointer to the variable length part. The ESAM determines how much space to allocate for the fixed length part of a variable length field in these tables based on the data that was historically put into these tables. In one embodiment, a database management system (DBMS) maintains a historical record that includes fields identifying the table, column and application ID, as well as fields that track a count and a total length. For each variable length field in a Structured Query Language (SQL) statement such as CREATE table or ALTER table, the DBMS finds a matching historical record, determines an estimated optimal fixed portion length based on the matching historical record, and sets a space allocation length for the fixed length part of the variable length field based on the estimated optimal fixed portion length. This dynamic space allocation approach is especially advantageous in situations where an empty table will be loaded with a massive amount of data.

The foregoing and other features and advantages of the invention will be apparent from the following more particular description of the preferred embodiments of the invention, as illustrated in the accompanying drawings.

BRIEF DESCRIPTION OF THE DRAWINGS

The preferred exemplary embodiments of the present invention will hereinafter be described in conjunction with the appended drawings, where like designations denote like elements.

FIG. 4 is a flow diagram illustrating a method for initializing a historical record associated with a fixed length part of a VARCHAR field in accordance with the preferred embodiments of the present invention.

FIG. 5 is a block diagram illustrating an example data structure for a historical record associated with a fixed length part of a VARCHAR field in accordance with the preferred embodiments of the present invention.

DETAILED DESCRIPTION OF THE PREFERRED EMBODIMENTS 1.0 Overview

In accordance with the preferred embodiments of the present invention, an enhanced space allocation mechanism (ESAM) dynamically allocates space for a fixed length part of variable length fields, such as VARCHAR fields, in database tables. Each record in such a variable length field has a fixed length part, a variable length part, and a pointer to the variable length part. The ESAM determines how much space to allocate for the fixed length part of a variable length field in these tables based on the data that was historically put into these tables. This is done by the ESAM to optimize the trade-off between the amount of storage space needed versus the speed of accessing the data. For example, if there are 100 records in a table, and all but one of the records has 100 characters of data in a VARCHAR field (with the odd-ball record having 2000 characters of data in the VARCHAR field), the ESAM may make the fixed length part 100 characters in size so that 99% of the time it is unnecessary to follow pointers and so that no storage space is wasted (as compared to making the fixed length part greater than 100 characters in size). In one embodiment, a database management system (DBMS) maintains a historical record that includes fields identifying the table, column and application ID, as well as fields that track a count and a total length. For each variable length field in a Structured Query Language (SQL) statement such as CREATE table or ALTER table, the DBMS finds a matching historical record, determines an estimated optimal fixed portion length based on the matching historical record, and sets a space allocation length for the fixed length part of the variable length field based on the estimated optimal fixed portion length. This dynamic space allocation approach is especially advantageous in situations where an empty table will be loaded with a massive amount of data.

2.0 Detailed Description

Figure 1:
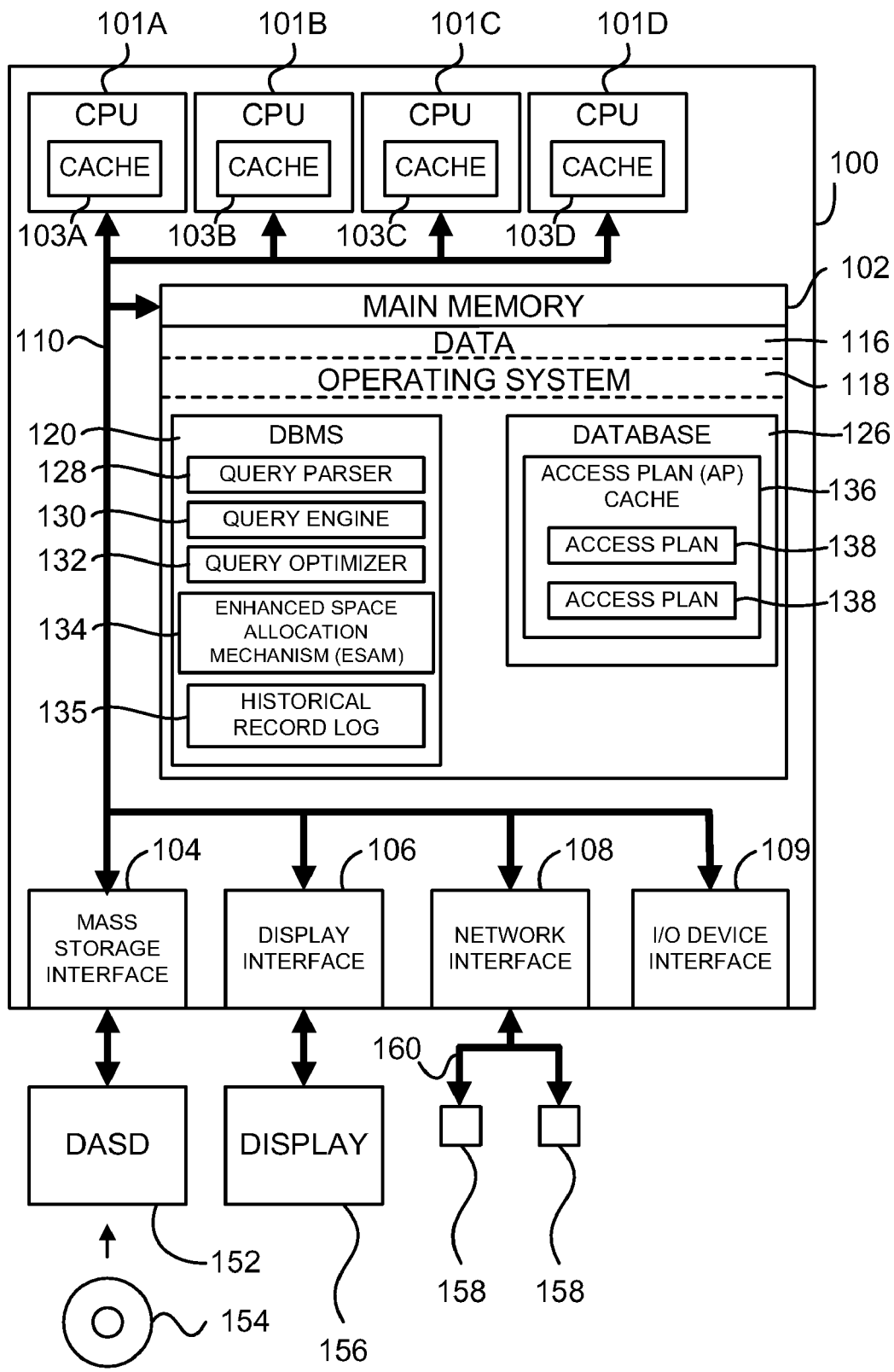
FIG. 1 is a block diagram of a computer apparatus for dynamically allocating space for a fixed length part of a variable length field in accordance with the preferred embodiments of the present invention.

A computer system implementation of the preferred embodiments of the present invention will now be described with reference to FIG. 1 in the context of a particular computer system 100, i.e., an IBM eServer iSeries or System i computer system. However, those skilled in the art will appreciate that the method, apparatus, and computer program product of the present invention apply equally to any computer system, regardless of whether the computer system is a complicated multi-user computing apparatus, a single user workstation, a PC, or an embedded control system. As shown in FIG. 1, computer system 100 comprises a one or more processors 101A, 101B, 101C and 101D, a main memory 102, a mass storage interface 104, a display interface 106, a network interface 108, and an I/O device interface 109. These system components are interconnected through the use of a system bus 110.

FIG. 1 is intended to depict the representative major components of computer system 100 at a high level, it being understood that individual components may have greater complexity than represented in FIG. 1, and that the number, type and configuration of such components may vary. For example, computer system 100 may contain a different number of processors than shown.

Processors 101A, 101B, 101C and 101D (also collectively referred to herein as "processors 101") process instructions and data from main memory 102. Processors 101 temporarily hold instructions and data in a cache structure for more rapid access. In the embodiment shown in FIG. 1, the cache structure comprises caches 103A, 103B, 103C and 103D (also collectively referred to herein as "caches 103") each associated with a respective one of processors 101A, 101B, 101C and 101D. For example, each of the caches 103 may include a separate internal level one instruction cache (L1 I-cache) and level one data cache (L1 D-cache), and level two cache (L2 cache) closely coupled to a respective one of processors 101. However, it should be understood that the cache structure may be different; that the number of levels and division of function in the cache may vary; and that the system might in fact have no cache at all.

Main memory 102 in accordance with the preferred embodiments contains data 116, an operating system 118 and application software, utilities and other types of software. In addition, main memory 102 includes a database management system (DBMS) 120 and a database 126, each of which may in various embodiments exist in any number. Although the DBMS 120 and the database 126 are illustrated as being contained within the main memory 102, in other embodiments some or all of them may be on different electronic devices (e.g., the database 126 may be on direct access storage device 152) and may be accessed remotely (e.g., via the network 160). Also, although an access plan (AP) cache 136 is illustrated as being contained within the database 126, in other embodiments the AP cache 136 may be at least partially located elsewhere (e.g., the AP cache 136 may be in the DBMS 120).

The exemplary DBMS 120 includes a query parser 128, a query engine 130, a query optimizer 132, an enhanced space allocation mechanism (ESAM) 134, and a historical record log 135. The query parser 128 is preferably implemented as computer program instructions that parse a structured query language (SQL) query. An SQL query is presented to the DBMS 120 in text form, the parameters of the SQL command. The query parser 128 retrieves the elements of the SQL query from the text form of the query and places them in a data structure more useful for data processing of an SQL query by the DBMS 120.

The query engine 130 performs a query against the database 126 using a query access plan that the query optimizer 132 creates. When the DBMS 120 receives a query, the DBMS 120 interprets the query and the query optimizer 132 determines what internal steps are necessary to satisfy the query. These internal steps may include identification of the table or tables specified in the query, the row or rows selected in the query, and other information such as whether to use an existing index, whether to build a temporary index, whether to use a temporary file to execute a sort, and/or the order in which the tables are to be joined together to satisfy the query. When taken together, these internal steps are typically referred to as a "query access plan" or "access plan" (AP), although they are sometimes referred to as an "execution plan".

As mentioned above, the query optimizer 132 creates the query access plan. The query optimizer 132 is preferably implemented as computer program instructions that optimize the access plan in dependence upon database management statistics. Database statistics may reveal, for example, that there are only two storeID values in the transactions table—so that it is an optimization, that is, more efficient, to scan the transactions table rather than using an index. Alternatively, database statistics may reveal that there are many transaction records with only a few transaction records for each storeID—so that it is an optimization, that is, more efficient, to access the transaction records by an index.

When the query optimizer 132 creates an access plan for a given query, the access plan 138 is saved by the database management system 120, often in an access plan cache 136 of the database 126. The access plan may also be saved in an SQL (Structured Query Language) package (not shown) or in a program object, e.g., the application program that requested the query. Then, when the user or a program object repeats the query, the database can reutilize the saved access plan instead of undergoing the time-consuming process of recreating it.

In accordance with the preferred embodiments of the present invention, the ESAM 134 provides dynamic allocation of space for the fixed length part of a variable length field in a database table as further described below with reference to FIGS. 2, 3 and 4. Each record in such a variable length field has a fixed length part, a variable length part, and a pointer to the variable length part. The ESAM 134 determines how much space to allocate for the fixed length part of a variable length field in the table based on the data that was historically put into the table. For example, the DBMS 120 may maintain in the historical record log 135 one or more historical records associated with the fixed length part of each variable length field. In accordance with the preferred embodiments of the present invention, and as further described below with reference to FIG. 5, each historical record may include fields identifying the table, the column and the application ID, as well as fields that track a count and a total length. The historical records may be maintained in the form of a log (i.e., historical record log 135) stored in the DBMS 120. Although FIG. 1 shows the historical record log 135 as being included in the DBMS 120, the historical records may be kept elsewhere, such as in the database 126.

In accordance with the preferred embodiments of the present invention, when encountering statements that call for a database table to be created or altered and that include variable length fields, the DBMS 120 finds a matching historical record, determines an estimated optimal fixed portion length based on the matching historical record, and sets a space allocation length for the fixed length part of the variable length field based on the estimated optimal fixed portion length. Such statements include, for example, CREATE table statements and ALTER table statements in the case of Structured Query Language (SQL) statements. Although SQL is a common interface, other interfaces such as QUERY (IBM iSeries), DDL, XML, etc. may be used to perform the requisite operations. The dynamic space allocation approach utilized in accordance with the preferred embodiments of the present invention is especially advantageous in situations where an empty table will be loaded with a massive amount of data, e.g., when global temp tables are being used, when MQTs (Materialized Query Tables) are being used, and when a specific application is started that, for example, loads a "data warehouse" (DW) such as a "data mart" (DM).

As an illustrative example, a specific application running on one or more processors may always truncate a table and then insert many records into the file with a given INSERT with a subselect statement. This type of application is prevalent with refreshing MQTs or loading a data mart. The appropriate value for the fixed length space allocation for a given VARCHAR field may be estimated by looking at the data that is going to be inserted into the column in question. While it is possible to look at the column data in the source table on-the-fly, it is preferable in accordance with the preferred embodiments of the present invention to have the database management system keep track of this statistic for one or more columns such that it is possible to query metadata, or historical records, and utilize this metadata to estimate the appropriate value for the fixed length space allocation, rather than look at the actual data in real time. Hence, in accordance with the preferred embodiments of the present invention, the database management system uses metadata to analyze what has happened in the past with respect to space allocation for the fixed length part of a given VARCHAR field and makes space allocation decisions for the fixed length part of the given VARCHAR field based on the historical record.

As another illustrative example, a human resource (HR) application running on one or more processors uses a temp global table to process historical information for a given employee. This HR application clears the temp table, loads the temp table with an employee's information, and then processes the table according to the application. Because this sequence of events reoccurs for every employee, the allocation of space for the fixed length part of VARCHAR fields in the temp table used with this HR application is more difficult than in the table used with the application in the previous paragraph. The space allocated for the fixed length part of VARCHAR fields in the temp table is dependent on one employee's historical information and, therefore, this fixed length space allocation may change for each separate load. In accordance with the preferred embodiments of the present invention, space is appropriately allocated for each separate load by keeping track of the statistic at the database level for every employee. Accordingly, the database management system keeps track of this statistic on an employee by employee basis for one or more columns such that it is possible to query metadata, or historical records, and utilize this metadata to estimate the appropriate value for the fixed length space allocation for each load.

For example, assume that the first table of the following two tables is used to populate a working table with the following select statement. As described above, the value for how much fixed space to allocate for the TEXT field in accordance with the preferred embodiments of the present invention may change based on the particular EMPID (employee ID for a given employee) used to populate the working table. Those skilled in the art will appreciate that it is possible to modify current indexing structures, current vector encoded index structures, and the like to hold the proper fixed length space allocation determined in accordance with the preferred embodiments of the present invention.

insert into acme/temp_employee
    (select empid, text from acme/employee_records where empid=?)

TABLE 1

CREATE TABLE ACME/temp_employee
(EMPID INTEGER NOT NULL WITH DEFAULT,
TEXT VARCHAR (4000) NOT NULL WITH DEFAULT)

TABLE 2

CREATE TABLE ACME/employee_records
(EMPID INTEGER NOT NULL WITH DEFAULT,
firstname CHAR (10) NOT NULL WITH DEFAULT,
LASTNAME VARCHAR (50) NOT NULL WITH DEFAULT,
TEXT VARCHAR (4000) NOT NULL WITH DEFAULT)

In the preferred embodiments of the present invention, the ESAM 134 includes instructions capable of executing on the processors 101 or statements capable of being interpreted by instructions executing on the processors 101 to perform the functions as further described below with reference to FIGS. 2, 3 and 4. In another embodiment, the ESAM 134 may be implemented in hardware via logic gates and/or other appropriate hardware techniques in lieu of, or in addition to, a processor-based system.

While the ESAM 134 is shown separate and discrete from the other components of the DBMS 120 (e.g., the query parser 128, the query engine 130, and the query optimizer 132) in FIG. 1, the preferred embodiments expressly extend to the ESAM 134 being implemented within one or more of the other components of the DBMS 120. In addition, the ESAM 134 may be implemented in the operating system 118 or application software, utilities, or other types of software within the scope of the preferred embodiments.

Computer system 100 utilizes well known virtual addressing mechanisms that allow the programs of computer system 100 to behave as if they have access to a large, single storage entity instead of access to multiple, smaller storage entities such as main memory 102 and DASD device 152. Therefore, while data 116, operating system 118, DBMS 120, and database 126, are shown to reside in main memory 102, those skilled in the art will recognize that these items are not necessarily all completely contained in main memory 102 at the same time. It should also be noted that the term "memory" is used herein to generically refer to the entire virtual memory of the computer system 100.

Data 116 represents any data that serves as input to or output from any program in computer system 100. Operating system 118 is a multitasking operating system known in the industry as OS/400 or IBM i5/OS; however, those skilled in the art will appreciate that the spirit and scope of the present invention is not limited to any one operating system.

Processors 101 may be constructed from one or more microprocessors and/or integrated circuits. Processors 101 execute program instructions stored in main memory 102. Main memory 102 stores programs and data that may be accessed by processors 101. When computer system 100 starts up, processors 101 initially execute the program instructions that make up operating system 118. Operating system 118 is a sophisticated program that manages the resources of computer system 100. Some of these resources are processors 101, main memory 102, mass storage interface 104, display interface 106, network interface 108, I/O device interface 109 and system bus 110.

Although computer system 100 is shown to contain four processors and a single system bus, those skilled in the art will appreciate that the present invention may be practiced using a computer system that has a different number of processors and/or multiple buses. In addition, the interfaces that are used in the preferred embodiments each include separate, fully programmed microprocessors that are used to off-load compute-intensive processing from processors 101. However, those skilled in the art will appreciate that the present invention applies equally to computer systems that simply use I/O adapters to perform similar functions.

Mass storage interface 104 is used to connect mass storage devices (such as a direct access storage device 152) to computer system 100. One specific type of direct access storage device 152 is a readable and writable CD ROM drive, which may store data to and read data from a CD ROM 154.

Display interface 106 is used to directly connect one or more displays 156 to computer system 100. These displays 156, which may be non-intelligent (i.e., dumb) terminals or fully programmable workstations, are used to allow system administrators and users (also referred to herein as "operators") to communicate with computer system 100. Note, however, that while display interface 106 is provided to support communication with one or more displays 156, computer system 100 does not necessarily require a display 156, because all needed interaction with users and processes may occur via network interface 108.

Network interface 108 is used to connect other computer systems and/or workstations 158 to computer system 100 across a network 160. The present invention applies equally no matter how computer system 100 may be connected to other computer systems and/or workstations, regardless of whether the network connection 160 is made using present-day analog and/or digital techniques or via some networking mechanism of the future. In addition, many different network protocols can be used to implement a network. These protocols are specialized computer programs that allow computers to communicate across network 160. TCP/IP (Transmission Control Protocol/Internet Protocol) is an example of a suitable network protocol.

The I/O device interface 109 provides an interface to any of various input/output devices.

At this point, it is important to note that while this embodiment of the present invention has been and will be described in the context of a fully functional computer system, those skilled in the art will appreciate that the present invention is capable of being distributed as a program product in a variety of forms, and that the present invention applies equally regardless of the particular type of signal bearing media used to actually carry out the distribution. Examples of suitable signal bearing media include: recordable type media such as floppy disks and CD ROMs (e.g., CD ROM 154 of FIG. 1), and transmission type media such as digital and analog communications links (e.g., network 160 in FIG. 1). A computer readable storage media includes floppy disks and CD ROMs.

Figure 2:
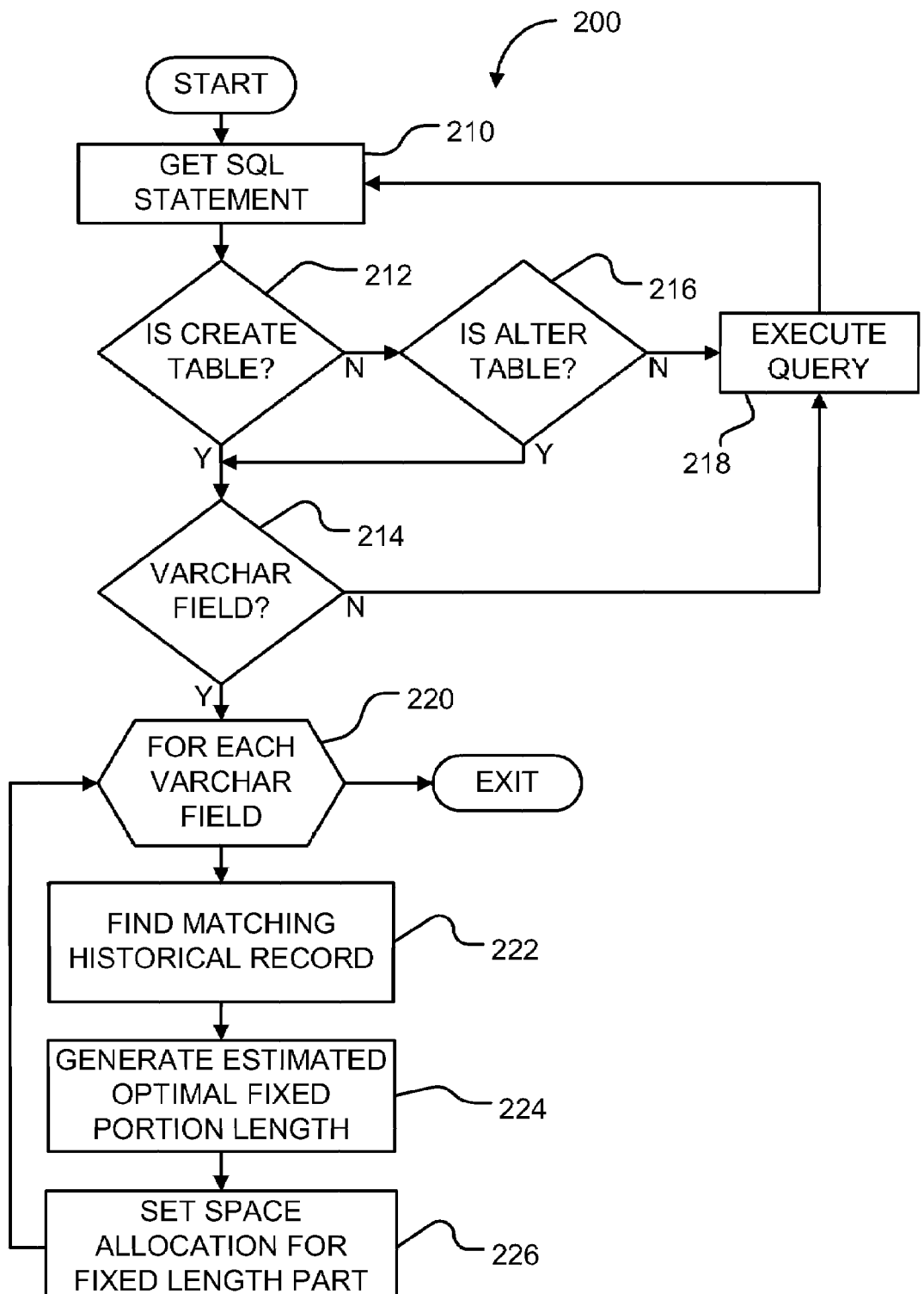
FIG. 2 is a flow diagram illustrating a method for dynamically allocating space for a fixed length part of a VARCHAR field in accordance with the preferred embodiments of the present invention.

FIG. 2 is a flow diagram illustrating a method 200 for dynamically allocating space for the fixed length part of a VARCHAR field in accordance with the preferred embodiments of the present invention. In the method 200, the steps discussed below (steps 210-226) are performed. These steps are set forth in their preferred order. It must be understood, however, that the various steps may occur at different times relative to one another than shown, or may occur simultaneously. Moreover, those skilled in the art will appreciate that one or more of the steps may be omitted. The method 200 begins with the ESAM receiving an SQL statement (step 210). The method 200 continues with the ESAM determining whether the SQL statement received in step 210 is a CREATE table statement (step 212). If the ESAM determines in step 212 that the SQL statement received in step 210 is a CREATE table statement, the method 200 continues with the ESAM determining whether the table (to be created) includes one or more VARCHAR fields (step 214). On the other hand, if the ESAM determines in step 212 that the SQL statement received in step 210 is not a CREATE table statement, the method 200 continues with the ESAM determining whether the SQL statement received in step 210 is an ALTER table statement (step 216).

If the ESAM determines in step 216 that the SQL statement received in step 210 is an ALTER table statement, the method 200 continues with the ESAM determining whether the table (to be altered) includes one or more VARCHAR fields (step 214). On the other hand, if the ESAM determines in step 216 that the SQL statement received in step 210 is not an ALTER table statement, the method 200 continues with the DBMS executing the SQL query in a conventional manner (step 218). Likewise, if the ESAM determines in step 214 that the table (to be created or altered) does not include one or more VARCHAR fields, the method 200 continues with the DBMS executing the SQL query in a conventional manner (step 218).

If the ESAM determines in step 214 that the table (to be created or altered) includes one or more VARCHAR fields, the method 200 continues with the ESAM performing a series of steps (i.e., steps 222, 224 and 226) for each of the one or more VARCHAR fields (step 220). The method 200 continues with the ESAM finding a matching historical record for a first of the one or more VARCHAR fields (step 222). In step 222, the ESAM may search for a historical record corresponding to the first VARCHAR field in a log of historical records stored in the DBMS, for example. As further described below with reference to FIG. 5, in accordance with the preferred embodiments of the present invention, each historical record may include fields identifying the table, the column and the application ID, as well as fields that track a count and a total length. Accordingly, a historical record in the log may be determined by the ESAM in step 222 to correspond to the first VARCHAR field when the column field of the historical record matches the first VARCHAR field. In addition, the method 200 may also require in step 222 a match with respect to the table field and/or the application ID field.

The method 200 continues with the ESAM determining an estimated optimal fixed portion length of the first VARCHAR field based on the matching historical record (step 224). In step 224, the ESAM may, for example, determine an estimated optimal fixed portion length of the first VARCHAR field based on the value in total length field of the matching historical record. The estimated optimal fixed portion length may be identical to the value in the total length field of the matching historical record or, alternatively, the estimated optimal fixed portion length may be an adjusted-version of the value in the total length field of the matching historical record that is increased to provide a suitable margin of safety, for example.

The method 200 continues with the ESAM setting a space allocation length for the fixed length part of the first VARCHAR field based the estimated optimal fixed portion length determined in step 224 (step 226). After completing step 226, the method 200 returns to step 220 and repeats steps 222, 224 and 226 for each subsequent one, if any, of the one or more VARCHAR fields. The method 200 exits after steps 222, 224 and 226 have been performed with respect to all of the one or more VARCHAR fields.

Figure 3:
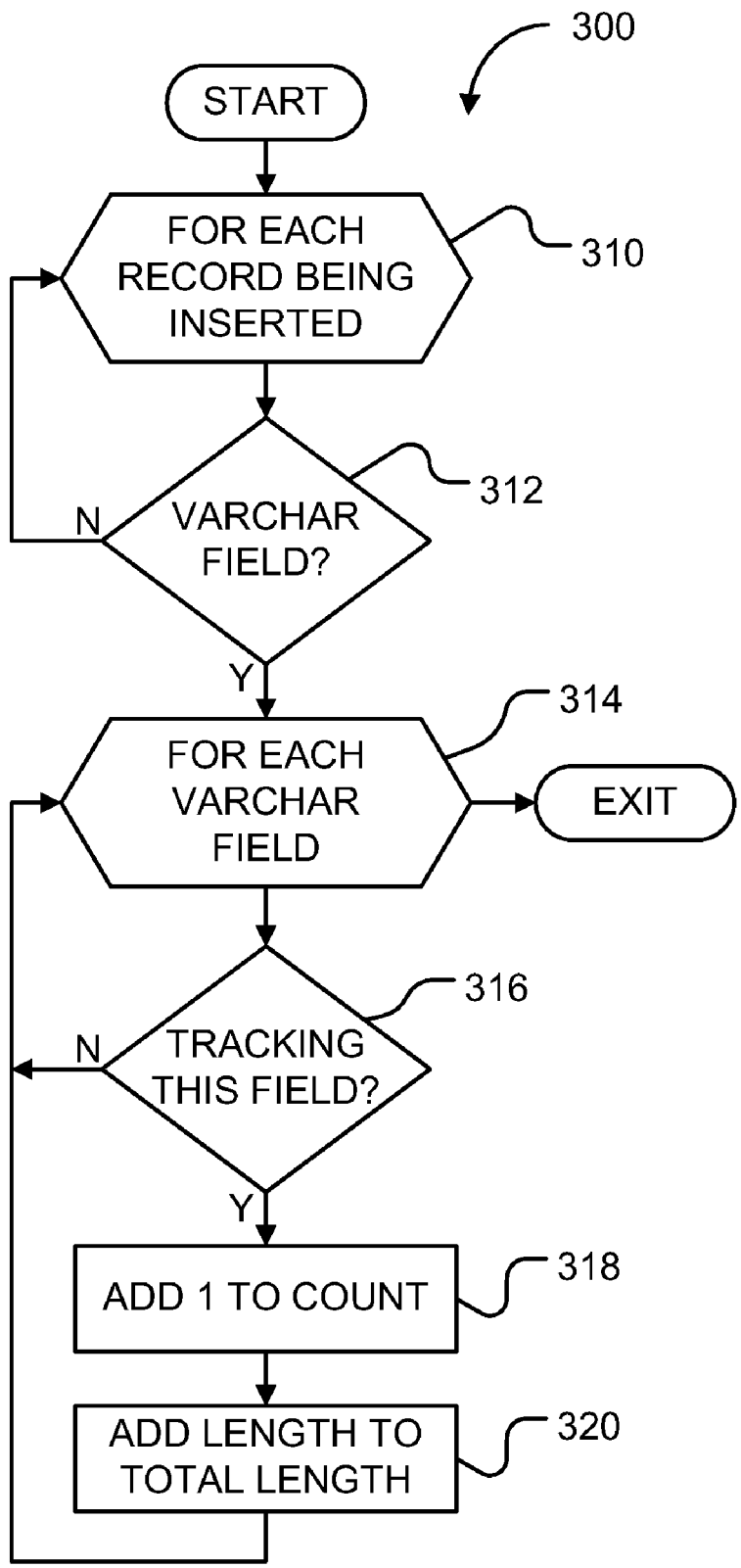
FIG. 3 is a flow diagram illustrating a method for maintaining a historical record associated with a fixed length part of a VARCHAR field in accordance with the preferred embodiments of the present invention.

FIG. 3 is a flow diagram illustrating a method 300 for maintaining a historical record associated with the fixed length part of a VARCHAR field in accordance with the preferred embodiments of the present invention. In the method 300, the steps discussed below (steps 310-320) are performed. These steps are set forth in their preferred order. It must be understood, however, that the various steps may occur at different times relative to one another than shown, or may occur simultaneously. Moreover, those skilled in the art will appreciate that one or more of the steps may be omitted. The method 300 begins with the ESAM determining for each record being inserted (step 310) whether that record has one or more VARCHAR fields (step 312). If the ESAM determines in step 312 that a first record being inserted does not have one or more VARCHAR fields, the method 300 returns to step 310 and repeats step 312 for each subsequent record, if any, to be inserted.

If the ESAM determines in step 312 that a first record being inserted has one or more VARCHAR fields, the method 300 continues with the ESAM determining for each VARCHAR field in the record being inserted (step 314) whether that VARCHAR field is being tracked (step 316). For example, this may be the first occurrence of a particular VARCHAR field and, thus, this particular VARCHAR field is not yet being tracked, i.e., no historical record is associated with this particular VARCHAR field. In this case, as described below with reference to FIG. 4, a historical record associated with the fixed length part of this particular VARCHAR field may be initialized by the ESAM. Also, it is possible to track some VARCHAR fields, while not tracking others.

If the ESAM determines in step 316 that a first VARCHAR field in the record being inserted is not being tracked, the method 300 returns to step 314 and repeats step 316 (and, if appropriate, steps 318 and 320 as discussed below) for each subsequent VARCHAR field, if any, in the record to be inserted.

On the other hand, if the ESAM determines in step 316 that a first VARCHAR field in the record being inserted is being tracked, the method 300 continues with the ESAM adding one to a count associated with the fixed length part of the first VARCHAR field in the record being inserted (step 318) and adding length to a total length associated with the first length part of the first VARCHAR field in the record being inserted (step 320). As further described below with reference to FIG. 5, in accordance with the preferred embodiments of the present invention, each historical record may include fields identifying the table, the column and the application ID, as well as fields that track a count and a total length. Accordingly, step 318 may include adding one to the count field of the historical record associated with the fixed length part of the first VARCHAR field in the record being inserted. Similarly, step 320 may include adding a length to the total length field of the historical record associated with the fixed length part of the first VARCHAR field in the record being inserted. After completing step 320 for the first VARCHAR field in the record being inserted, the method 300 returns to step 314 and repeats step 316 (and, if appropriate, steps 318 and 320) for each subsequent VARCHAR field, if any, in the record to be inserted. The method 300 exits after step 316 (and, if appropriate, steps 318 and 320) has/have been performed with respect to all of the one or more VARCHAR fields in all of the records being inserted.

FIG. 4 is a flow diagram illustrating a method 400 for initializing a historical record associated with the fixed length part of a VARCHAR field in accordance with the preferred embodiments of the present invention. In the method 400, the steps discussed below (steps 410-420) are performed. These steps are set forth in their preferred order. It must be understood, however, that the various steps may occur at different times relative to one another than shown, or may occur simultaneously. Moreover, those skilled in the art will appreciate that one or more of the steps may be omitted. The method 400 begins with the ESAM getting a particular table (step 412) for each table to be reset (step 410). The method 400 continues with the ESAM performing a series of steps (i.e., steps 416, 418 and 420) for each column to be reset (step 414). In step 416, the ESAM gets a particular column to be reset. In step 418, the ESAM sets a count associated with the fixed length part of that particular column to zero. In step 420, the ESAM sets the total length associated with the fixed length part of that particular column to zero. As further described below with reference to FIG. 5, in accordance with the preferred embodiments of the present invention, each historical record may include fields identifying the table, the column and the application ID, as well as fields that track a count and a total length. Accordingly, step 418 may include setting the count field of the historical record associated with the fixed length part of the column to zero. Similarly, step 420 may include setting the total length field of the historical record associated with the fixed length part of the column to zero.

FIG. 5 is a block diagram illustrating an example data structure 500 for a historical record associated with the fixed length part of a VARCHAR field in accordance with the preferred embodiments of the present invention. In accordance with the preferred embodiments of the present invention, each historical record includes a table field 510, a column field 512, an application ID field 514, a count field 516, a total length field 518, and a percent-to-cover field 520. The table field 510, the column field 512, and the application ID field 514 respectively identify a table in which the VARCHAR field is present, a column of the table in which the VARCHAR field is present, and an application that uses the table in which the VARCHAR field is present. The count field 516, the total length field 518, and the percent-to-cover field 520 are respectively a count, a total length, and a percent-to-cover associated with the fixed length part of records in the VARCHAR field that have been inserted for the particular table, column and application.

One skilled in the art will appreciate that many variations are possible within the scope of the present invention. Thus, while the present invention has been particularly shown and described with reference to preferred embodiments thereof, it will be understood by those skilled in the art that changes in form and details may be made therein without departing from the spirit and scope of the present invention.

What is claimed is:

1. A computer-implemented method for dynamically allocating space for a fixed length part of a variable length field in a database table, comprising the steps of:

determining, by using a computer, whether statement calls for a table to be created or altered;

if the statement calls for the table to be created or altered, determining whether a variable length field is included in the statement; and if a variable length field is included in the statement, for each variable length field included in the statement, performing steps of finding a matching historical record maintained by a database management system (DBMS), determining an estimated optimal fixed portion length based on the matching historical record, and setting a space allocation length for the fixed length part of the variable length field based on the estimated optimal fixed portion length, wherein the statement is a CREATE table statement or an ALTER table statement, wherein the variable length field is a variable character (VARCHAR) field, and wherein each record in the VARCHAR field includes a fixed length part, a variable length part, and a pointer to the variable length part, wherein the historical record maintained by the DBMS includes a count and a total length associated with the fixed length part of the VARCHAR field, wherein the historical record is initialized by performing the steps of:

for each table to reset, getting the table;

for each column in the table to reset, getting the column, setting the count in a historical record associated with the fixed length part of the column to zero, and setting the total length in the historical record associated with the fixed length part of the column to zero.

2. The computer-implemented method as recited in claim 1, further comprising the steps of:

determining whether a statement calls for a record to be inserted in a table;

if it is determined that a statement calls for a record to be inserted in a table, determining whether a VARCHAR field is included in the record;

if it is determined that a VARCHAR field is included in the record, for each VARCHAR field included in the record, performing the steps of adding one to the count in the historical record and adding a length to the total length in the historical record.

3. A data processing system, comprising:

a processor;

a memory coupled via a bus to the processor, the memory encoded with instructions that when executed by the processor perform the steps of:

determining whether statement calls for a table to be created or altered;

if the statement calls for the table to be created or altered, determining whether a variable length field is included in the statement; and if a variable length field is included in the statement, for each variable length field included in the statement, performing the steps of finding a matching historical record maintained by a database management system (DBMS), determining an estimated optimal fixed portion length based on the matching historical record, and setting a space allocation length for a fixed length part of the variable length field based on the estimated optimal fixed portion length, wherein the statement is a CREATE table statement or an ALTER table statement, wherein the variable length field is a variable character (VARCHAR) field, and wherein each record in the VARCHAR field includes a fixed length part, a variable length part, and a pointer to the variable length part, wherein the historical record maintained by the DBMS includes a count and a total length associated with the fixed length Dart of the VARCHAR field; and wherein the instructions when executed on the processor initialize the historical record by performing the steps of:

for each table to reset, getting the table, for each column in the table to reset, getting the column, setting the count in a historical record associated with the fixed length part of the column to zero, and setting the total length in the historical record associated with the fixed length part of the column to zero.

4. The data processing system as recited in claim 3, wherein the instructions when executed on the processor further comprising the steps of:

determining whether a statement calls for a record to be inserted in a table;

if it is determined that a statement calls for a record to be inserted in a table, determining whether a VARCHAR field is included in the record;

if it is determined that a VARCHAR field is included in the record, for each VARCHAR field included in the record, performing the steps of adding one to the count in the historical record and adding a length to the total length in the historical record.

5. A computer program product stored in a computer readable storage media for dynamically allocating space for a fixed length part of a variable length field in a database table, the computer program product comprising:

a plurality of executable instructions, wherein the executable instructions, when executed by at least one processor, cause a digital computing device to perform the steps of:

determining whether statement calls for a table to be created or altered;

if the statement calls for the table to be created or altered, determining whether a variable length field is included in the statement;

if a variable length field is included in the statement, for each variable length field included in the statement, performing the steps of finding a matching historical record maintained by a database management system (DBMS); and determining an estimated optimal fixed portion length based on the matching historical record, and setting a space allocation length for the fixed length part of the variable length field based on the estimated optimal fixed portion length, wherein the statement is a CREATE table statement or an ALTER table statement, wherein the variable length field is a variable character (VARCHAR) field, and wherein each record in the VARCHAR field includes a fixed length part, a variable length part, and a pointer to the variable length part, wherein the historical record maintained by the DBMS includes a count and a total length associated with the fixed length Dart of the VARCHAR field, and wherein the executable instructions, when executed on the at least one Processor, initialize the historical record by performing the steps of:

for each table to reset, getting the table, for each column in the table to reset, getting the column, setting the count in a historical record associated with the fixed length part of the column to zero, and setting the total length in the historical record associated with the fixed length part of the column to zero.

6. The computer program product as recited in claim 5, wherein the executable instructions, when executed by the at least one processor, further cause the digital computing device to perform the steps of:

determining whether a statement calls for a record to be inserted in a table;

if it is determined that a statement calls for a record to be inserted in a table, determining whether a VARCHAR field is included in the record;

if it is determined that a VARCHAR field is included in the record, for each VARCHAR field included in the record, performing the steps of adding one to the count in the historical record and adding a length to the total length in the historical record.

* * * * *